US006208605B1

(12) United States Patent
Akiba

(10) Patent No.: US 6,208,605 B1
(45) Date of Patent: *Mar. 27, 2001

(54) TRAY GUIDE MECHANISM FOR EASY ASSEMBLY OF A DISK DRIVE

(75) Inventor: Takao Akiba, Ohmiya (JP)

(73) Assignee: TEAC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,460

(22) Filed: Feb. 6, 1997

(30) Foreign Application Priority Data

Feb. 16, 1996 (JP) .................................................. 8-029499

(51) Int. Cl.[7] .................................................. G11B 33/02
(52) U.S. Cl. .................................................. 369/77.1
(58) Field of Search .................................. 369/75.1, 75.2, 369/77.1, 77.2

(56) References Cited

U.S. PATENT DOCUMENTS 4,561,085 * 12/1985 Funabashi ........................... 369/77.1
4,710,910 * 12/1987 Ejiri ..................................... 369/75.2
4,794,583 * 12/1988 Funabashi et al. ................. 369/75.2
5,091,898 * 2/1992 Bessho et al. ...................... 369/77.2
5,381,393 * 1/1995 Ohtani ................................ 369/77.2

FOREIGN PATENT DOCUMENTS

7254199 * 10/1995 (JP) .

* cited by examiner

Primary Examiner—Brian E. Miller
Assistant Examiner—Tod Kupstas
(74) Attorney, Agent, or Firm—Ladas & Parry

(57) ABSTRACT

A tray guide mechanism for guiding a movement of a tray in one of an inserting direction to insert the tray into a chassis of a disk apparatus and an ejecting direction to eject the tray from the chassis includes a rail connecting unit provided on a side of the tray, the rail connecting unit being integrally formed with the tray. A slide rail is movably supported on the rail connecting unit. A rail guide unit is fixed onto a side of the chassis and movably supports the slide rail on the rail guide unit. In the tray guide mechanism, the rail connecting unit on the side of the tray comprises a pair of longitudinally extending projections with a groove between the projections, the slide rail being fitted into the groove of the rail connecting unit.

11 Claims, 16 Drawing Sheets

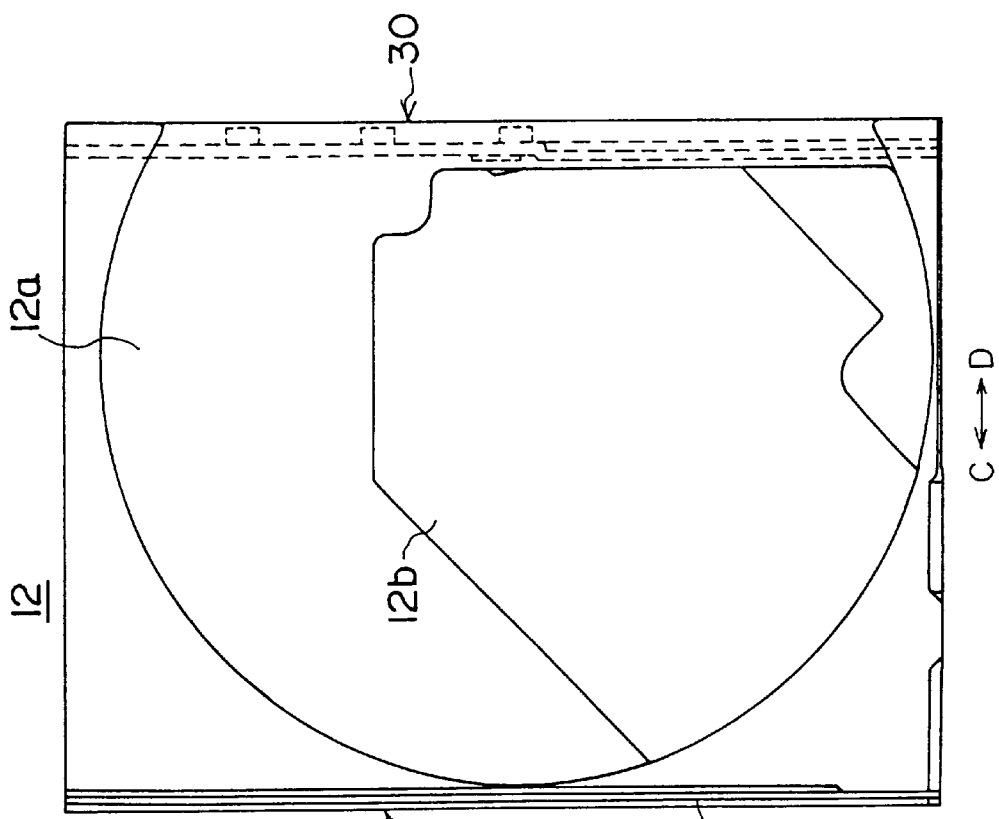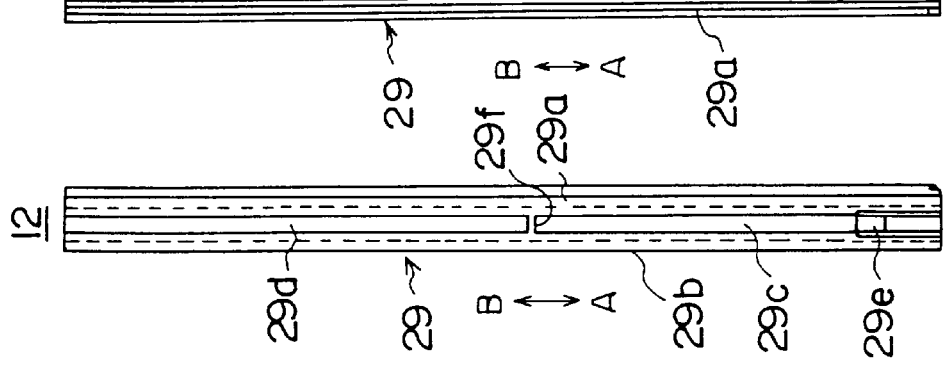

TRAY GUIDE MECHANISM FOR EASY ASSEMBLY OF A DISK DRIVE

BACKGROUND OF THE INVENTION (1) Field of the Invention

The present invention generally relates to a tray guide mechanism of a disk drive, and more particularly to an improvement of a tray guide mechanism which guides a movement of a tray in one of an inserting direction to insert the tray into a chassis of a disk drive and an ejecting direction to eject the tray from the chassis, a disk placed on the tray being accessed by the disk drive.

(2) Description of the Related Art

A CD-ROM (Compact Disk-Read Only Memory) disk drive for use within a notebook-size personal computer is known. A CD-ROM is a type of an optical disk which is capable of storing a large amount of data including programs or database data. The CD-ROM, which is placed in the CD-ROM disk drive, is accessed by a laser pickup of the CD-ROM disk drive so that data is reproduced from the CD-ROM.

A CD-ROM disk apparatus having a tray guide mechanism for guiding a movement of the tray in an inserting direction of the disk apparatus or an ejecting direction of the disk apparatus is known. The tray is provided for placing a disk thereon, and the disk being placed on the tray is the CD-ROM which is accessed by the CD-ROM disk apparatus. The tray with the disk being placed thereon is inserted into the disk apparatus in the inserting direction or ejected from the disk apparatus in the ejecting direction with the aid of the tray guide mechanism.

FIG. 16 shows a conventional CD-ROM disk apparatus of the above type. FIG. 17 shows a tray guide mechanism of the CD-ROM disk apparatus in FIG. 16. For example, Japanese Laid-Open Patent Application No.7-254199 discloses a CD-ROM disk apparatus of the above type.

As shown in FIG. 16, the CD-ROM disk apparatus includes a tray 1 which is slidably arranged therein and movable in both an ejecting direction "A" and an inserting direction "B". When a disk (not shown) is loaded into the disk apparatus, the tray 1 with the disk being placed thereon is manually inserted into the disk apparatus in the inserting direction B and set at a loaded position in the disk apparatus.

In the disk apparatus in FIG. 16, a drive unit is provided below the tray 1. A turntable 2 which is rotated by a spindle motor (not shown) is attached to the drive unit, and the disk being placed on the tray 1 is held on the turntable 2. An optical pickup 3 for accessing the disk to read out data from the disk is attached to the drive unit. Further, a pickup moving unit (not shown) for moving the pickup 3 in a radial direction of the disk is attached to the drive unit.

In the above disk apparatus, an ejection unit for ejecting the tray 1 from a chassis 9 is provided. A front bezel 1b is attached to a front end surface of the tray 1. The front bezel 1b includes a rectangular opening which extends laterally in the front bezel 1b. An ejection switch part 4 is attached to the tray 1 and provided in the opening of the front bezel 1b.

When the ejection switch part 4 is manually pressed, the tray 1 is ejected from the chassis 9 by the ejection unit. When the ejecting operation is performed, the tray 1 is set at an ejected position by the ejection unit, and the tray 1 at the ejected position is further pulled out from the chassis 9 to a disk-change position by the operator. When the tray 1 is set at the disk-change position, the tray 1 is fully exposed and the disk on the tray 1 can be changed with a new one.

In the disk apparatus in FIG. 16, a tray guide mechanism 5 is provided to guide the movement of the tray 1 in either the inserting direction or the ejecting direction. FIG. 17 shows the tray guide mechanism 5 of the conventional disk apparatus in FIG. 16. The tray guide mechanism 5 includes a pair of movable rails 6, a pair of fixed rails 7, and a pair of slide rails 8.

The movable rails 6 are secured to the sides of the tray 1 by screws and arranged such that the movable rails 6 are movable to the chassis 9. The fixed rails 7 are secured to the chassis 9 by screws, and the fixed rails 7 are arranged on the chassis 9 so that the fixed rails 7 extend in directions parallel to the movable rails 6. The slide rails 8 are movably arranged between the movable rails 6 and the fixed rails 7 so that the slide rails 8 are movable to both the movable rails 6 of the tray 1 and the fixed rails 7 of the chassis 9.

As shown in FIG. 17, a pinion 8a is rotatably supported in the middle of each of the slide rails 8. Each of the movable rails 6 includes a rack 6a, and the pinion 8a of each slide rail 8 is engageable with the rack 6a of the movable rail 6. Each of the fixed rails 7 includes a rack 7a, and the pinion 8a of each slide rail 8 is engageable with the rack 7a of the fixed rail 7.

In the above tray guide mechanism 5, when the tray 1 is pulled out from the chassis 9, the movable rails 6 are moved relative to the slide rails 8 in the ejecting direction A by a distance "La", and the slide rails 8 are also moved relative to the fixed rails 7 in the ejecting direction A by a distance "Lb". When the slide rails 8 are moved relative to the fixed rails 7, the pinions 8a are rotated on the racks 7a of the fixed rails 7. As the pinions 8a are rotated and the tray 1 is supported on the slide rails 8 by the pinions 8a, the tray 1 can be moved relative to the chassis 9 in the ejecting direction A by a distance "L" which is equal to the sum of the distance "La" and the distance "Lb".

As described above, the above tray guide mechanism 5 requires the movable rails 6 with the racks 6a, the fixed rails 7 with the racks 7a, and the slide rails 8 with the pinions 8a. The number of parts needed for the tray guide mechanism 5 is relatively large, and it takes a long time to assemble the disk apparatus with the tray guide mechanism 5.

Further, in order to assemble the disk apparatus with the tray guide mechanism 5, it is necessary that the slide rails 8 are movably attached at their ends to the movable rails 6 and movably attached at the other ends to the fixed rails 7. It is also necessary that the pinions 8a of the slide rails 8 are attached such that the pinions 8a are engageable with both the racks 6a of the movable rails 6 and the racks 7a of the fixed rails 7. It is further necessary that the movable rails 6 are secured to the tray 1 by the screws and the fixed rails 7 are secured to the chassis 9 by the screws.

Accordingly, when the above tray guide mechanism 5 is installed to the disk apparatus, the tray guide mechanism 5 is assembled with the movable rails 6, the fixed rails 7 and the slide rails 8, and the movable rails 6 are secured to the sides of the tray 1 by the screws and the fixed rails 7 are secured to the chassis 9 by the screws. The time to assembly the disk apparatus with the tray guide mechanism 5 is relatively long, and the assembly processes for the component parts of the tray guide mechanism 5 are complicated. Therefore, it is difficult for the above tray guide mechanism to increase the productivity and reduce the manufacturing cost.

SUMMARY OF THE INVENTION

An object of the present invention is to provide an improved tray guide mechanism of a disk apparatus in which the above-described problems are eliminated.

Another object of the present invention is to provide a tray guide mechanism in which component parts thereof are easily installed to a disk apparatus to provide an increased productivity of the disk apparatus.

Still another object of the present invention is to provide a tray guide mechanism which has a simple structure to reduce the manufacturing cost of the disk apparatus and provides an increased productivity of the disk apparatus.

The above-mentioned objects of the present invention are achieved by a tray guide mechanism for guiding a movement of a tray in one of an inserting direction to insert the tray into a chassis of a disk apparatus and an ejecting direction to eject the tray from the chassis, a disk placed on the tray being accessed by the disk apparatus, the tray guide mechanism comprising: a rail connecting unit provided on a side of the tray, the rail connecting unit being integrally formed with the tray; a slide rail movably supported on the rail connecting unit; and a rail guide unit fixed onto a side of the chassis and movably supporting the slide rail on the rail guide unit, wherein the rail connecting unit on the side of the tray comprises a pair of longitudinally extending projections with a groove between the projections, the slide rail being fitted into the groove of the rail connecting unit.

The tray guide mechanism of the present invention includes the rail connecting unit, integrally formed with the tray, on which the slide rail is movable, and the total number of component parts of the disk apparatus is reduced to a number smaller than that of the conventional disk apparatus. It is unnecessary for the tray guide mechanism of the present invention to attach additional rail guide members to the sides of the tray in order for supporting the slide rails. The time to assembly the disk apparatus with the tray guide mechanism of the present invention can be reduced, and the assembly processes for the component parts of the tray guide mechanism are simplified. Therefore, the tray guide mechanism of the present invention makes it possible to improve the productivity and reduce the manufacturing cost.

BRIEF DESCRIPTION OF THE DRAWINGS

The above and other objects, features and advantages of the present invention will become more apparent from the following detailed description when read in conjunction with the accompanying drawings in which:

FIGS. 7A, 7B and 7C are a left side view, a top view and a right side view of the CD-ROM disk apparatus showing rail connecting portions on the sides of the tray;

DETAILED DESCRIPTION OF THE PREFERRED EMBODIMENT

A description will now be given of the preferred embodiment of the present invention with reference to the accompanying drawings.

Figure 1:
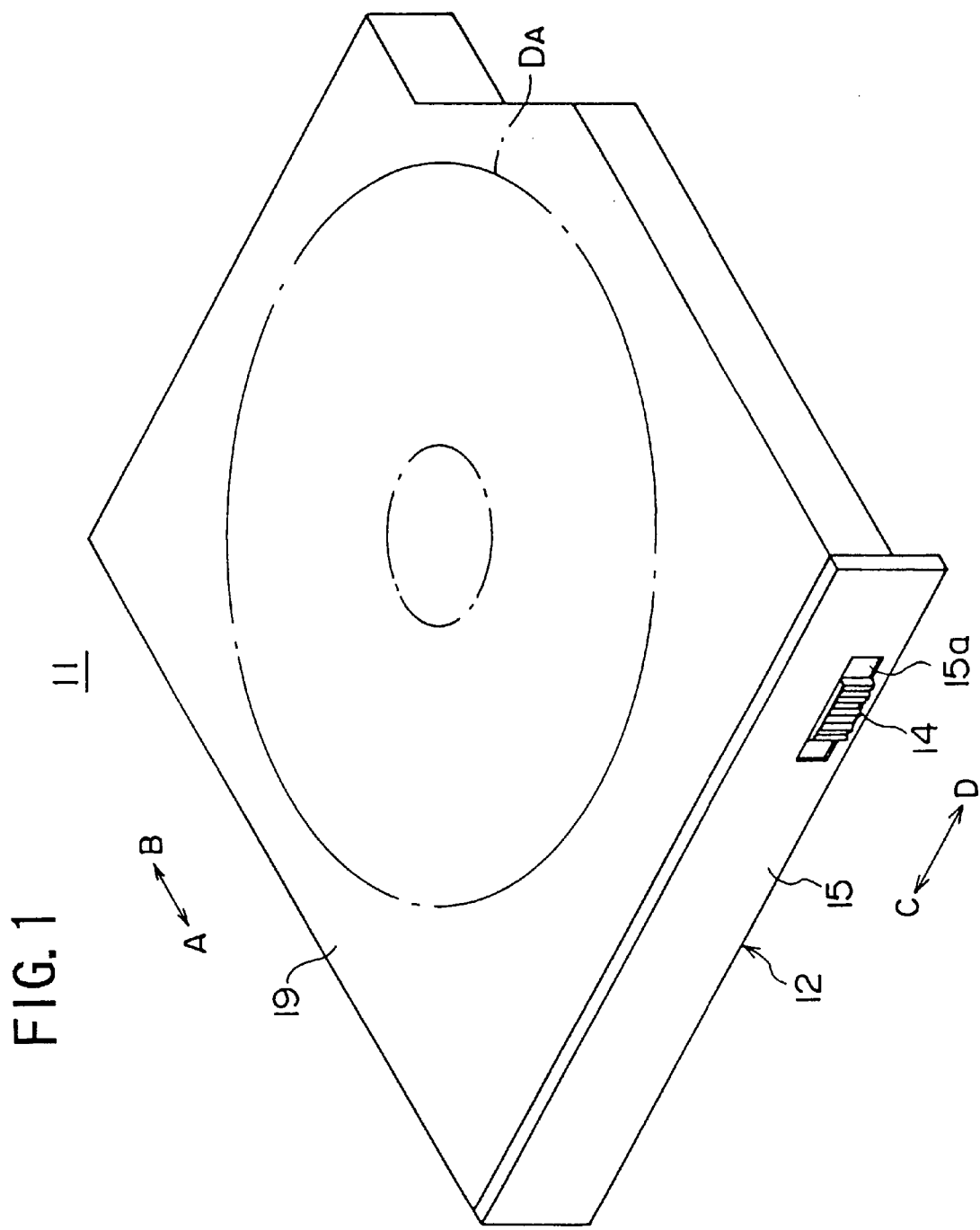
FIG. 1 is a perspective view of a CD-ROM disk apparatus to which one embodiment of the present invention is applied.

FIG. 1 shows a CD-ROM disk apparatus 11 to which a tray guide mechanism in one embodiment of the present invention is applied.

In the drawings of FIGS.1 through 15, an ejecting direction and an inserting direction with respect to the disk apparatus 11 are indicated by the arrow "A" and the arrow "B", and a lateral left direction and a lateral right direction with respect to the disk apparatus 11 are indicated by the arrow "C" and the arrow "D", respectively.

Referring to FIG. 1, the CD-ROM disk apparatus 11 is a built-in type disk drive which is installed in a notebook-size personal computer (not shown) for use therein.

The disk apparatus 11 includes a tray 12 which is slidably arranged therein and movable in both the ejecting direction A and the inserting direction B. A disk "DA" (indicated by a one-dot chain line in FIG. 1) which is a recording medium for storing information can be placed onto the tray 12. When the disk is loaded into the disk apparatus 11, the tray 12 with the disk being placed thereon is inserted into the disk apparatus 11 in the inserting direction B and set at a loaded position in the disk apparatus 11.

A front bezel 15 is attached to a front end surface of the tray 12. The front bezel 15 includes at its right end portion a rectangular opening 15a which extends laterally in the front bezel 15.

An ejection switch part 14 is attached to the front end surface of the tray 12 and provided in the opening 15a of the front bezel 15. The ejection switch part 14 is slidably arranged on the tray 12 such that the ejection switch part 14 is movable in the lateral left and right directions C and D. A spring (not shown in FIG. 1) exerts a biasing force on the ejection switch part 14 so as to move the ejection switch part 14 in the lateral right direction D. When the ejection switch part 14 is manually moved in the lateral left direction C against the biasing force of the spring, the tray 12 is ejected from the disk apparatus 11. This spring will be described later.

In the disk apparatus 11, the ejection switch part 14 is operable only in the lateral left and right directions C and D. Even if an operator on the notebook-size personal computer inadvertently touches the ejection switch part 14, the ejection switch part 14 is not easily moved in the lateral left direction C. Thus, the disk apparatus 11 of the present embodiment makes it possible to prevent the erroneous ejection of the tray 12 from the disk apparatus 11 during operation.

Figure 2:
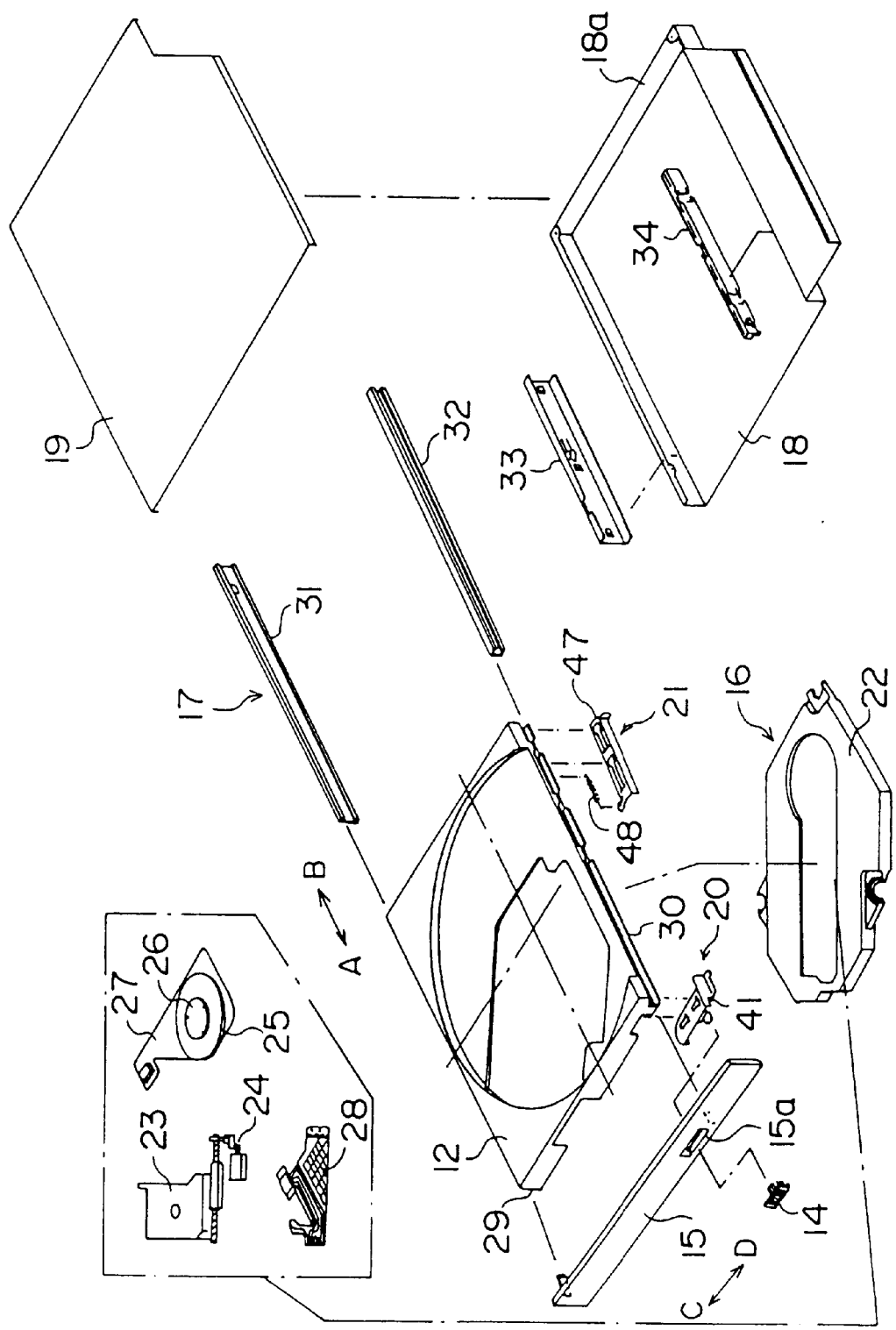
FIG. 2 is an exploded perspective view of the CD-ROM disk apparatus in FIG. 1.

FIG. 2 is an exploded view of the CD-ROM disk apparatus 11 in FIG. 1. Referring to FIG. 2, the CD-ROM disk apparatus 11 generally has the tray 12, a drive unit 16, a tray guide mechanism 17, a chassis 18, and a top plate 19. The drive unit 16 is fixed to a bottom surface of the tray 12. The tray guide mechanism 17 guides the movement of the tray 12 in one of the ejecting direction A to eject the tray 12 from the chassis 18 of the disk apparatus 11 and the inserting direction B to insert the tray 12 into the chassis 18. The chassis 18 is a protective case in which the tray 12 is enclosed. The top plate 19 is fixed to the chassis 18 so that a top surface of the tray 12 being inserted is fully covered with the top plate 19.

The tray 12 is formed with a lateral width smaller than an outside diameter of the disk (not shown) such that the disk on the tray 12 partially projects from the periphery of the tray 12. The tray 12 is manually movable to the chassis 18 in either the ejecting direction A or the inserting direction B between a disk-change position and a loaded position.

In the above-described disk apparatus 11, no tray moving mechanism which moves the tray 12 to the chassis 18 in either the ejecting direction A and the inserting direction B by using a motor or the like is provided. As the total number of parts for assembling the disk apparatus 11 is reduced, the disk apparatus 11 of the present embodiment makes it possible to provide a CD-ROM disk apparatus having a small size and a small height.

The disk apparatus 11 further includes an ejection unit 20 and a pressing unit 21. The ejection unit 20 is provided at a front end portion on the bottom surface of the tray 12. The ejection unit 20 is operable when the ejection switch part 14 is manually moved in the lateral left direction C. The pressing unit 21 is provided at a rear end portion on the bottom surface of the tray 12. The pressing unit 21 operates such that a spring (which will be described later) of the pressing unit 21 exerts a biasing force on the tray 12 so as to move the tray 12 in the ejecting direction A by the biasing force of the spring of the pressing unit 21.

As shown in FIG. 2, the drive unit 16 includes a base 22, a pickup part 23, a pickup moving part 24, a turntable 26, and a flexible printed circuit cable 28. The base 22 is fixed to the bottom surface of the tray 12. The pickup part 23 is attached to the base 22. The pickup moving part 34 moves the pickup part 23 in a radial direction of the disk being loaded. The turntable 26 is rotated by a spindle motor 25 on a printed circuit board 27. The flexible printed circuit cable 28 interconnects the pickup part 23 and the printed circuit board 27 to which the spindle motor 25 is attached.

The tray guide mechanism 17 of the present embodiment includes a pair of rail connecting portions 29 and 30, a pair of slide rails 31 and 32, and a pair of rail guide parts 33 and 34. The rail connecting portions 29 and 30 are formed with the tray 12 on the left side and the right side of the tray 12. The slide rails 31 and 32 are movably supported on the rail connecting portions 29 and 30. The rail guide parts 33 and 34 are fixed to inside left and right walls of the chassis 18, and movably support the slide rails 31 and 32 on the inside left and right walls of the chassis 18.

When the tray 12 is pulled out from the chassis 18 in the ejecting direction A, the slide rails 31 and 32 are also pulled out, together with the tray 12, from the chassis 18 in the ejecting direction A. That is, when the ejection switch part 14 is manually moved in the lateral left direction C, the tray 12 and the slide rails 31 and 32 are pulled out from the chassis 18 to an ejected position. The tray 12 at the ejected position is movably held on the rail guide parts 33 through the slide rails 31 and 32, such that the tray 12 is movable to the chassis 18 between the ejected position and the disk-change position.

Figure 3:
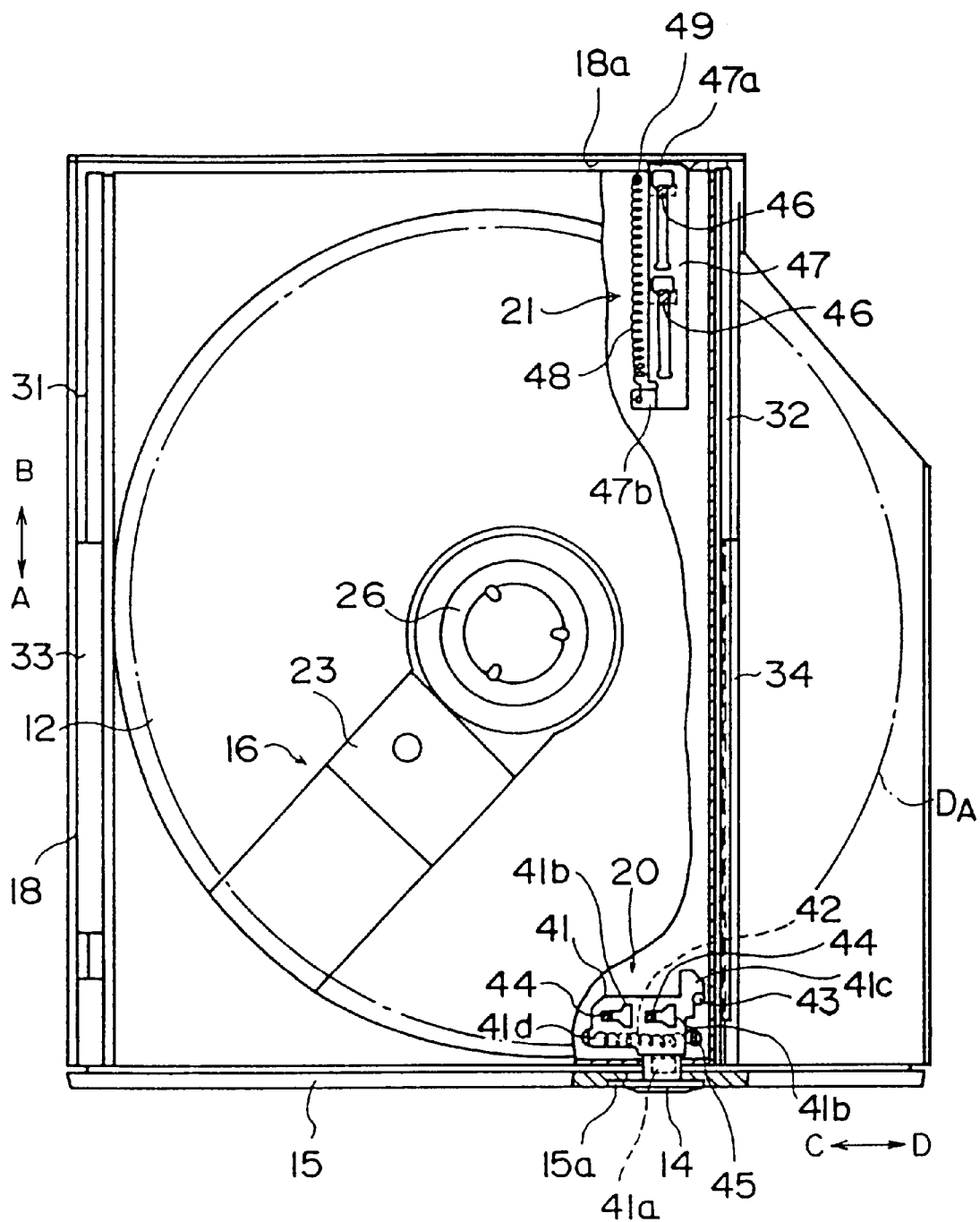
FIG. 3 is a diagram showing an ejection unit and a pressing unit in the CD-ROM disk apparatus in which a tray is set at a loaded position.

FIG. 3 shows the ejection unit 20 and the pressing unit 21 in the CD-ROM disk apparatus 11 in which the tray 12 is set at the loaded position.

The ejection unit 20 is installed in the disk apparatus 11, and it is operable when the ejection switch part 14 is manually moved in the lateral left direction C on the front bezel 15. As shown in FIG. 3, the ejection unit 20 includes a connecting part 41, a helical spring 42, and a pin 43.

The connecting part 41 of the ejection unit 20 is movably supported on the bottom surface of the tray 12 such that the connecting part 41 is movable in either the lateral left direction C or the lateral right direction D. The helical spring 42 exerts a biasing force on the connecting part 41 so as to move the connecting part 41 in the lateral right direction D by the biasing force of the spring 42. The pin 43 is embedded in the chassis 18. The connecting part 41 is locked at the loaded position with the pin 43 when the ejection switch part 14 is not manually moved. When the ejection switch part 14 is manually moved in the lateral left direction C, the connecting part 41 is unlocked from the pin 43 such that the tray 12 can be moved in the ejecting direction A and ejected from the chassis 18.

The connecting part 41 includes a front extending portion 41a, a pair of sliding holes 41b, a hook portion 41c, and a spring fixing portion 41d. The front extending portion 41a of the connecting part 41 is connected to the ejection switch part 14 so that the connecting part 41 is laterally moved with the ejection switch part 14 through the front extending portion 41a when the ejection switch part 14 is manually moved. A pair of downward projecting pins 44 are embedded in the bottom surface of the tray 12. The projecting pins 44 are fitted to the sliding holes 41b of the connecting part 41 so that the lateral movement of the ejection unit 20 on the tray 12 is restricted by connection of the sliding holes 41b with the projecting pins 44.

The hook portion 41c at the rear end of the connecting part 41 is engageable with the pin 43 on the chassis 18. One end of the helical spring 42 is fixed to the spring fixing portion 41d of the connecting part 41. The other end of the helical spring 42 is fixed to a spring fixing pin 45 which is embedded in the chassis 18. Thus, the helical spring 42 exerts the biasing force on the ejection switch part 14 so as to move the ejection switch part 14 in the lateral right direction D on the front bezel 15 by the biasing force of the spring 42.

As described above, the connecting part 41 is movably supported on the tray 12 such that the connecting part 41 is movable in either the lateral left direction C or the lateral right direction D, and the helical spring 42 exerts the biasing force on the ejection switch part 14 so as to move the ejection switch part 14 in the lateral right direction D. Therefore, the hook portion 41c is engaged with the pin 43 by the biasing force of the spring 42 when the ejection switch part 14 is not manually moved. When the ejection switch part 14 is manually moved in the lateral left direction C against the biasing force of the spring 42, the connecting part 41 is moved with the ejection switch part 14 in the same direction C so that the hook portion 41c is unlocked from the pin 43. This position of the ejection unit 20 at which the hook portion 41c of the connecting part 41 is unlocked from the pin 43 is called an unlocked position.

Accordingly, when the tray 12 is set at the loaded position, the hook portion 41c of the connecting part 41 on the bottom surface of the tray 12 is locked with the pin 43 on the chassis 18 so that the tray 12 is locked with the pin 43 at the loaded position. After the disk DA being placed on the tray 12 is clamped on the turntable 26, the front bezel 15 is pushed in the inserting direction B, and the tray 12 is moved to the chassis 18 in the inserting direction B to the loaded position, so that the connecting part 41 at the loaded position is locked with the pin 43.

The pressing unit 21 exerts a biasing force of a spring on the tray 12 so as to move the tray in the ejecting direction A by the biasing force of the spring. The pressing unit 21 serves to move the tray 12 in the ejecting direction A by a desired distance when the ejection unit 20 is set at the unlocked position, so that the tray 12 at the ejected position can be easily pulled out to the disk-change position.

The pressing unit 21 includes a pressing lever 47 and a helical spring 48. A pair of downward projecting pins 46 are embedded in the bottom surface of the tray 12. The pressing lever 47 is movably fitted into the projecting pins 46. The helical spring 48 exerts a biasing force on the tray 12 such that the tray 12 is moved in the ejecting direction A by the biasing force of the spring 48 by connection of the pressing lever 47 with the chassis 18.

The chassis 18 includes a rear end surface 18a and an extended lateral wall 18b. A rear end 47a of the pressing lever 47 is brought into contact with the rear end surface 18a of the chassis 18. A front end 47b of the pressing lever 47 is fixed to one end of the helical spring 48. The front end 47b of the pressing lever 47 is called a spring fixing portion. A spring fixing pin 49 is embedded in the bottom surface of the tray 12. The other end of the helical spring 48 is fixed to the spring fixing pin 49. Thus, the helical spring 48 exerts the biasing force on the tray 12 such that the tray 12 is moved in the ejecting direction A by the biasing force of the spring 48. As the ejection direction A is at right angles with the lateral left and right directions C and D, the ejection switch part 14 and the connecting part 41 are arranged such that they are not moved by the biasing force of the helical spring 48.

When the tray 12 is inserted in the disk apparatus 11, the rear end 47a of the pressing lever 47 is brought into contact with the read end surface 18a of the chassis 18. By the inserting operation, the helical spring 48 is expanded from the original length of the spring 48 by a distance "L" which is equivalent to a length of the pressing lever 47 in which the rear end 47a is projecting from the rear end surface of the tray 12.

When the tray 12 is set at the loaded position, the pressing lever 47 is pressed on the rear end surface 18a of the chassis 18 by the biasing force of the helical spring 48, and the reaction force by the rear end surface 18a to the tray 12 acts to move the tray 12 in the ejecting direction A.

Figure 4:
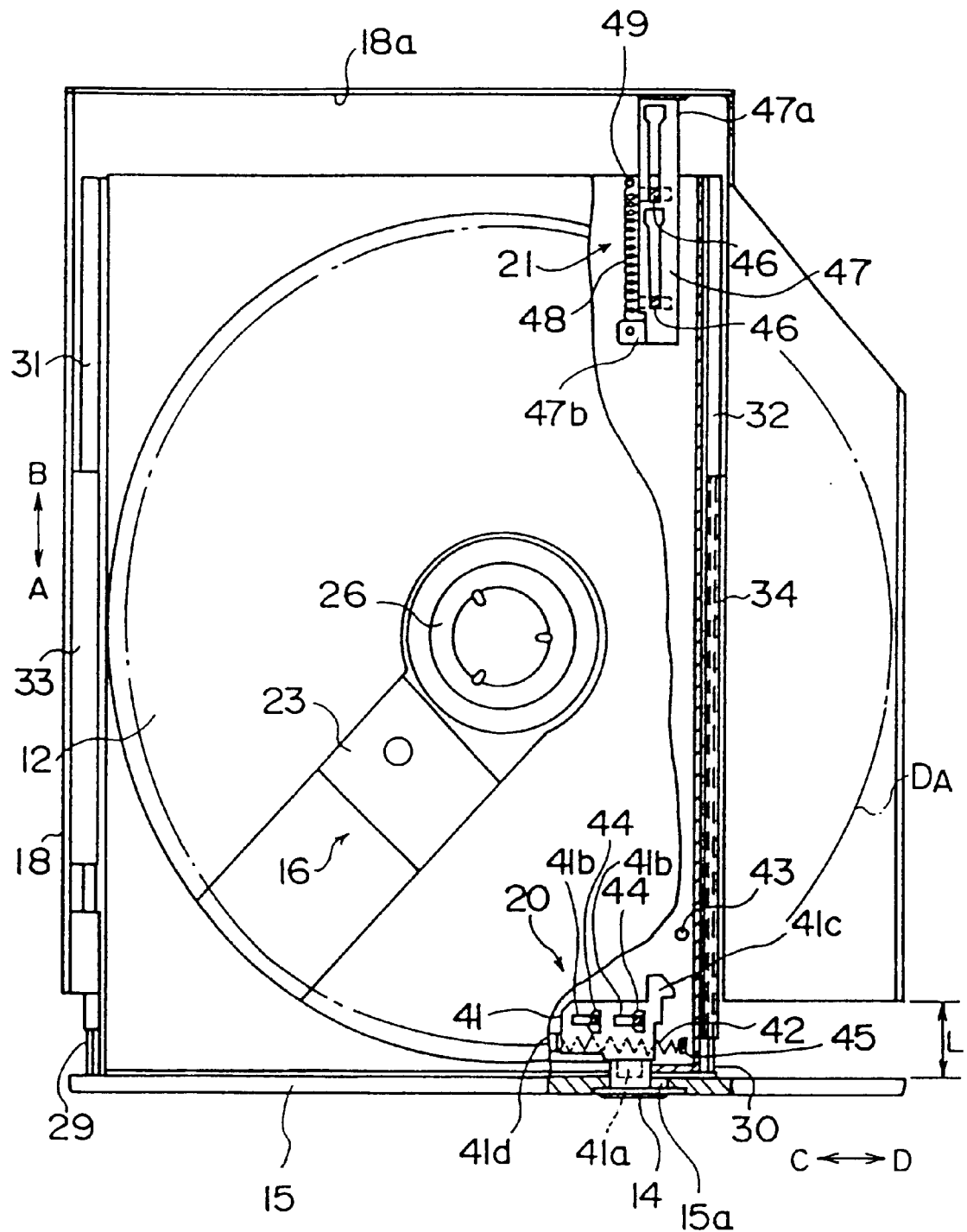
FIG. 4 is a diagram showing the ejection unit and the pressing unit in the CD-ROM disk apparatus when an ejection switch part is manually moved to eject the tray from the disk apparatus.
Figure 5:
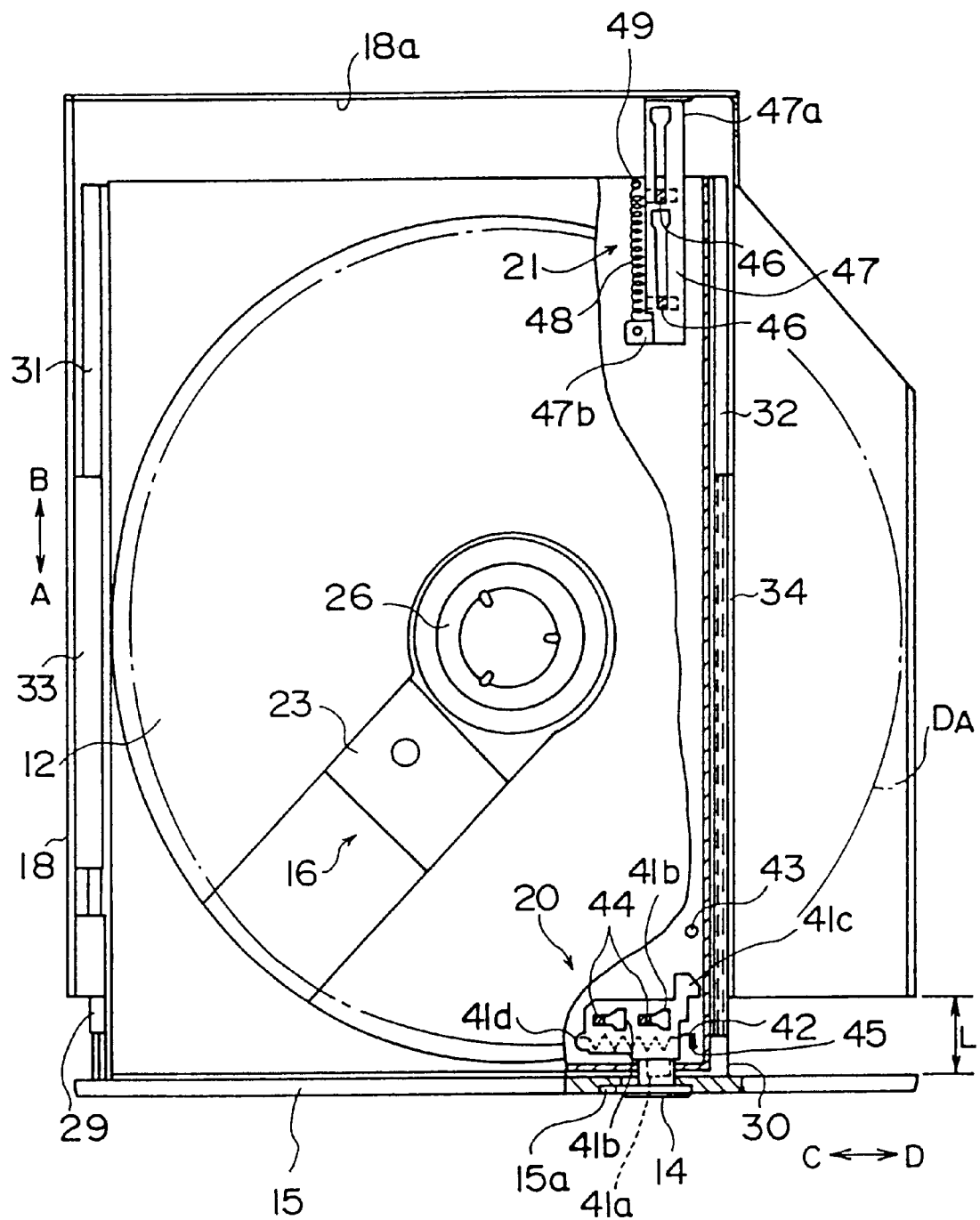
FIG. 5 is a diagram showing the ejection unit and the pressing unit in the CD-ROM disk apparatus when the ejection switch part is returned to the original position after the ejection operation is performed.

FIG. 4 shows the ejection unit 20 and the pressing unit 21 in the disk apparatus 11 when the ejection switch part 14 is manually moved to eject the tray 12 from the disk apparatus 11. FIG. 5 shows the ejection unit 20 and the pressing unit 21 in the disk apparatus 11 when the ejection switch part 14 is returned to the original position after the ejecting operation is performed.

As shown in FIG. 4, when the ejection switch part 14 is manually moved in the lateral left direction C, the ejection unit 20 is moved in the same direction so that the connecting part 41 is unlocked from the pin 43 and set at the unlocked position. The pressing lever 47 is pressed on the rear end surface 18a of the chassis 18 by the biasing force of the helical spring 48, and the reaction force by the rear end surface 18a to the tray 12 serves to move the tray 12 in the ejecting direction A.

As described above, the tray 12 is ejected from the chassis 18, and the front bezel 15 is moved relative to the chassis 18 in the ejecting direction A to the ejected position. A distance between the front end of the chassis 18 and the ejected position of the front bezel 15 is equal to a distance "L" indicated in FIG. 4. The operator on the disk apparatus 11 can easily move the tray 12 from the ejected position to the disk-change position by pulling out the tray 12 from the chassis 18.

As shown in FIG. 5, if the ejection switch part 14 is released, the ejection switch part 14 and the connecting part 41 are returned back to the original positions in the lateral right direction D due to the biasing force of the spring 42. When the tray 12 is set at the disk-change position, the operator can change the disk on the tray 12 with a new one. After the disk on the tray 12 is changed with the new one, the front bezel 15 is manually moved to the chassis 18 in the inserting direction B. The tray 12 and the connecting part 41 are moved to the chassis 18 in the inserting direction B due to the biasing force of the spring 48. As the biasing force of the spring 42 is exerted on the connecting part 41 so as to move the connecting part 41 in the lateral right direction D, the hook portion 41c is locked with the pin 43 and the tray 12 is set at the loaded position.

Figure 6:
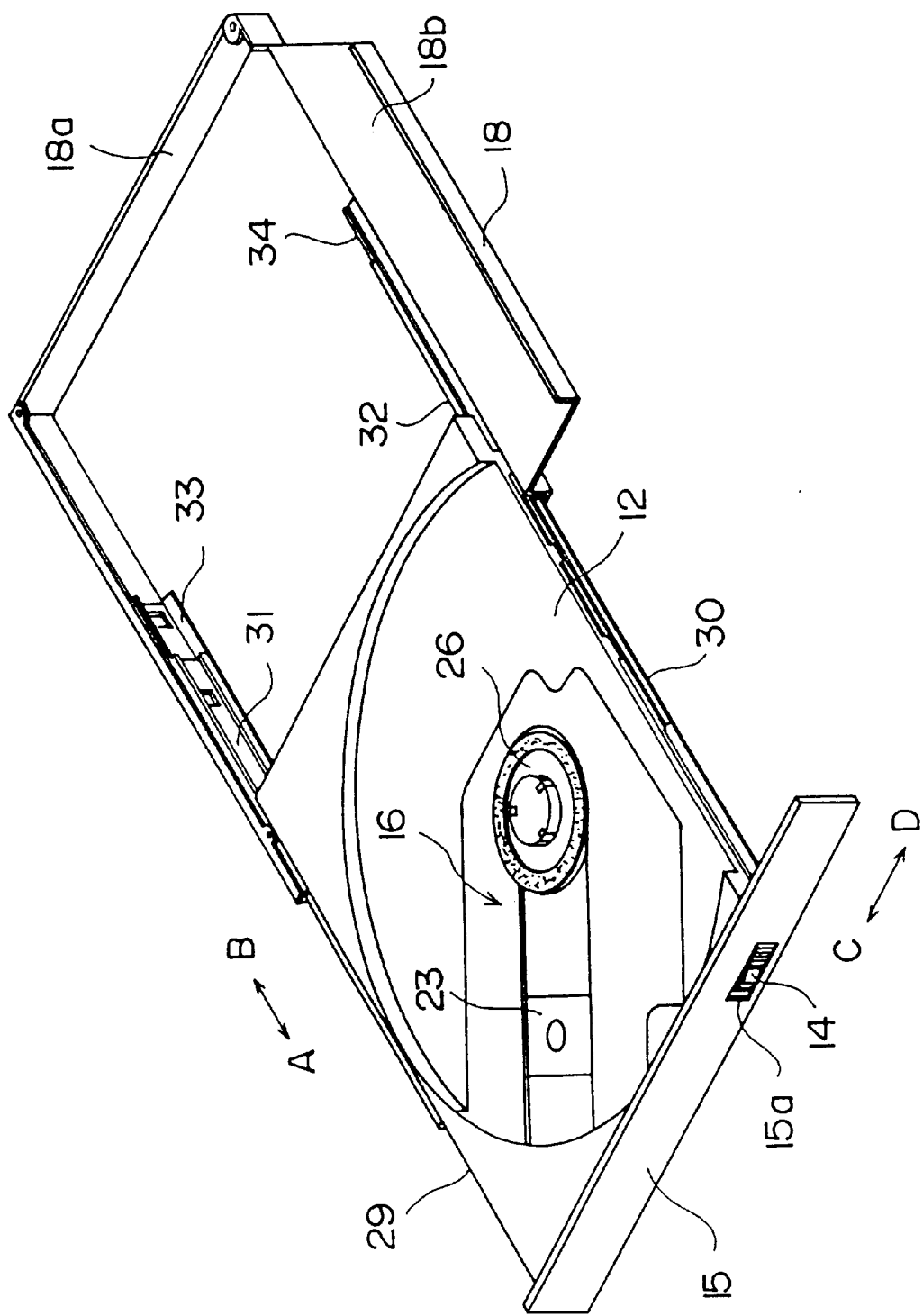
FIG. 6 is a perspective view of the CD-ROM disk apparatus in which the tray is set at a disk-change position.

FIG. 6 shows the disk apparatus 11 in which the tray 12 is pulled out from the chassis 18 and set at the disk-change position.

As shown in FIG. 6, when the tray 12 is set at the ejected position after the ejecting operation, the front bezel 15 is manually pulled out from the ejected position so that the tray 12 is moved in the ejecting direction A to the disk-change position. As the tray 12 is moved in the ejecting direction A, the slide rails 31 and 32 which are movably supported on the tray 12 are also moved in the ejecting direction A. When the tray 12 is set at the disk-change position, the tray 12 is movably supported on the chassis 18 by the rail guide parts 33 and 34 via the slide rails 31 and 32.

As described above, when the tray 12 is set at the disk-change position, the disk held on the turntable 26 is fully exposed from the chassis 18, and the operator can change the disk on the tray 12 with the new one. After the disk on the tray 12 is changed with the new one, the front bezel 15 is manually moved to the chassis 18 in the inserting direction B. The tray 12 and the connecting part 41 are moved to the chassis 18 in the inserting direction B due to the biasing force of the spring 48.

Next, a description will be given of the tray guide mechanism 17 of the present embodiment, which is applied to the CD-ROM disk apparatus 11.

FIGS. 7A, 7B and 7C show the rail connecting portions 29 and 30 of the tray 12 in FIG. 1. As shown in FIGS. 7A–7C, the tray 12 includes a circular recess 12a on the top surface of the tray 12, and the shape of the recess 12a generally corresponds to the circumference of the disk DA. An opening 12b is provided generally in the middle of the recess 12a. The pickup part 23 and the turntable 26 are attached to the drive unit 16 such that the pickup part 23 and the turntable 26 are located in the opening 12b of the tray 12.

Figure 16:
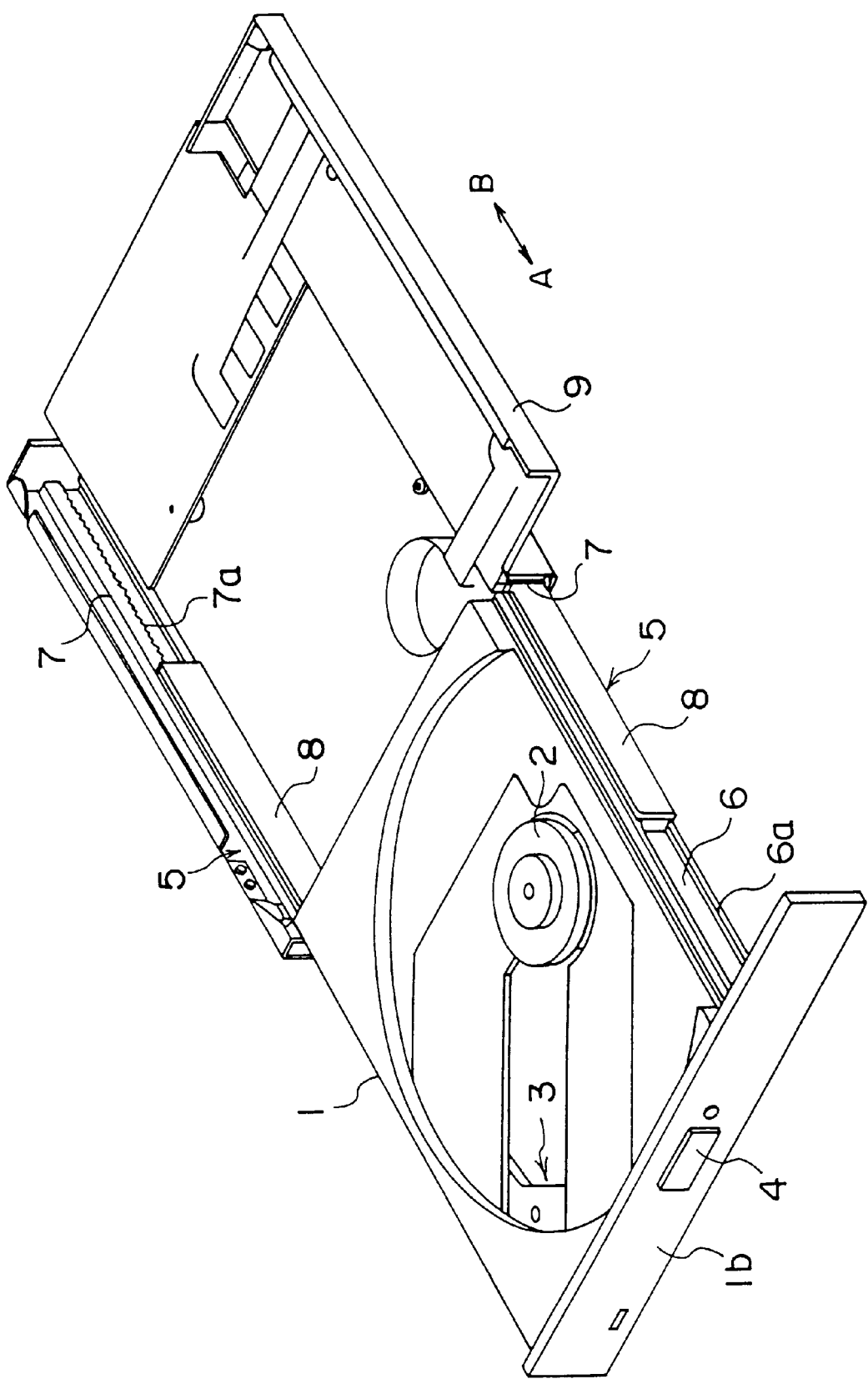
FIG. 16 is a perspective view of a conventional CD-ROM disk apparatus.
Figure 17:
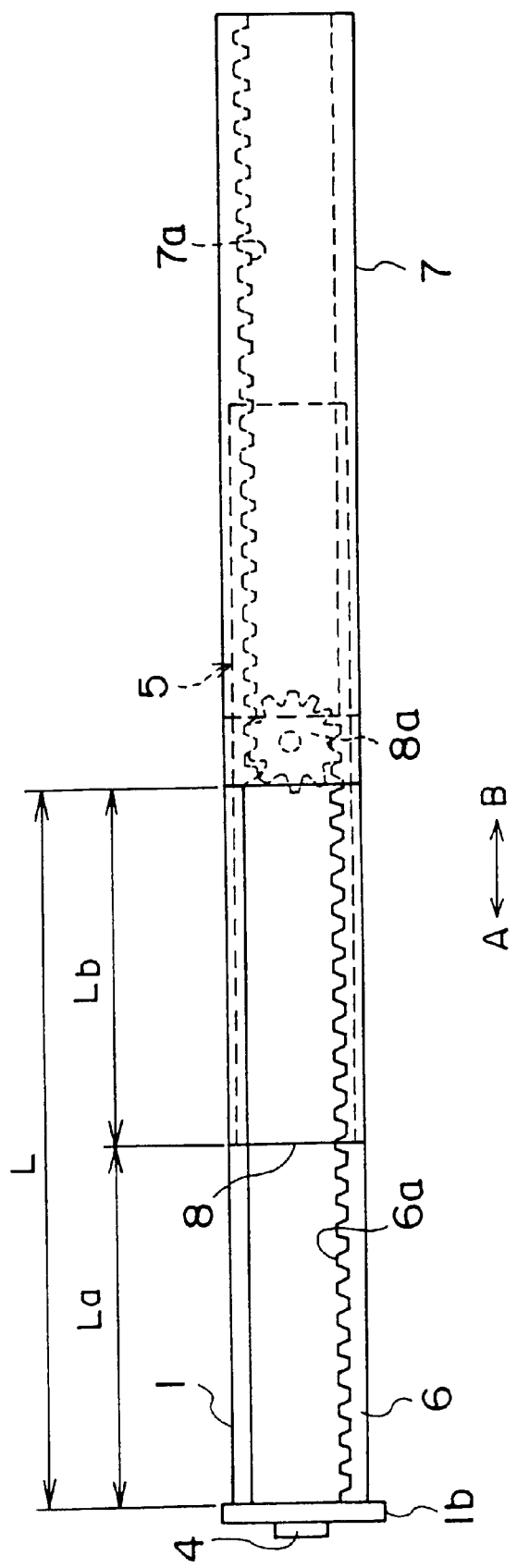
FIG. 17 is a side view of a tray guide mechanism in the disk apparatus in FIG. 16.

The tray 12 is produced from a resin material by resin molding. The rail connecting portions 29 and 30 on the sides of the tray 12 are integrally formed with the tray by carrying out resin molding by using the same resin material. Therefore, it is unnecessary for the tray guide mechanism 17 of the present embodiment to attach additional rail guide members to the sides of the tray 12 by screws, in order for supporting the slide rails 31 and 32 on the tray 12. The total number of component parts for the tray guide mechanism 17 of the present embodiment is reduced to a number smaller than that of the conventional disk apparatus shown in FIGS. 16 and 17.

Figure 8:
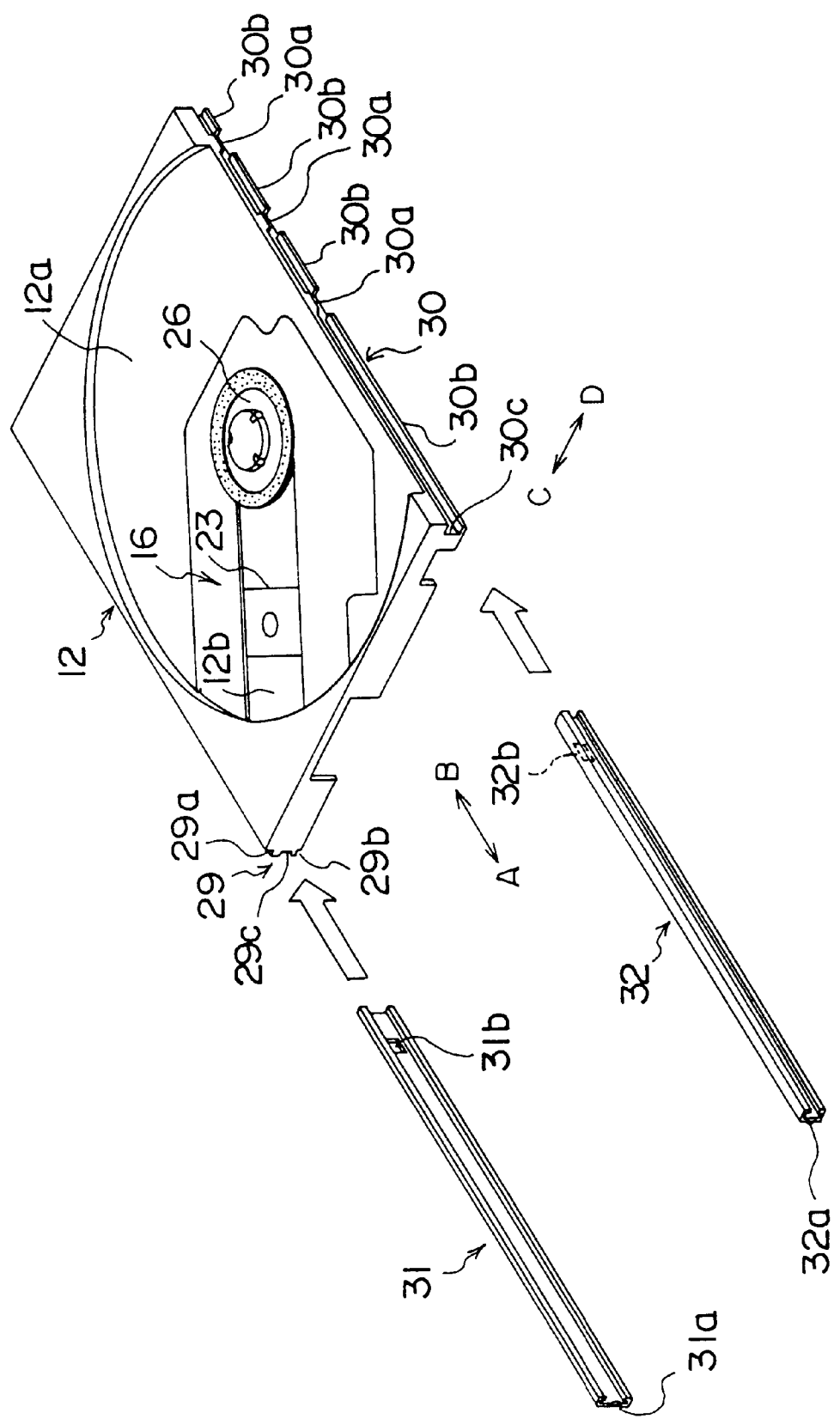
FIG. 8 is a diagram for explaining an installing operation to install slide rails to the tray.

FIG. 8 shows an installing operation to install the slide rails 31 and 32 to the rail connecting portions 29 and 30 of the tray 12.

As shown in FIGS. 7 and 8, the rail connecting portion 29 has a cross section which is generally in the shape of the character "T", and extends in the ejecting and inserting directions A and B. The rail connecting portion 29 includes a pair of longitudinally extending lateral projections 29a and 29b. A groove 29c and a groove 29d are provided between the lateral projection 29a and the lateral projection 29b, and the groove 29c and the groove 29d are separated from each other along the lateral projections 29a and 29b. A recess 29e is provided in the groove 29c at a front end portion of the rail connecting portion 29, and a connecting claw 15c of the front bezel 15 is fitted into the recess 29e. A land 29f is provided in the middle of the rail connecting portion 29 such that the groove 29c and the groove 29d are separated from each other by the land 29f, and the lateral projections 29a and 29b are interconnected by the land 29f.

As shown in FIGS. 7 and 8, the rail connecting portion 30 has a cross section which is generally in the shape of the character "C", and extends in the ejecting and inserting directions A and B. The rail connecting portion 30 includes a plurality of downward projections 30a on an upper surface of the rail connecting portion 30 and a plurality of upward projections 30b on a lower surface of the rail connecting portion 30. The downward projections 30a and the upward projections 30b are placed along the rail connecting portion 30 at given intervals. A longitudinally extending groove 30c is provided in a front half of the rail connecting portion 30. A recess 30e is provided in the groove 30c at a front end portion of the rail connecting portion 30, and a connecting claw 15d of the front bezel 15 is fitted into the recess 30e. A land 30f is provided at an end of the groove 30c which is located in the middle of the rail connecting portion 30.

Figure 9:
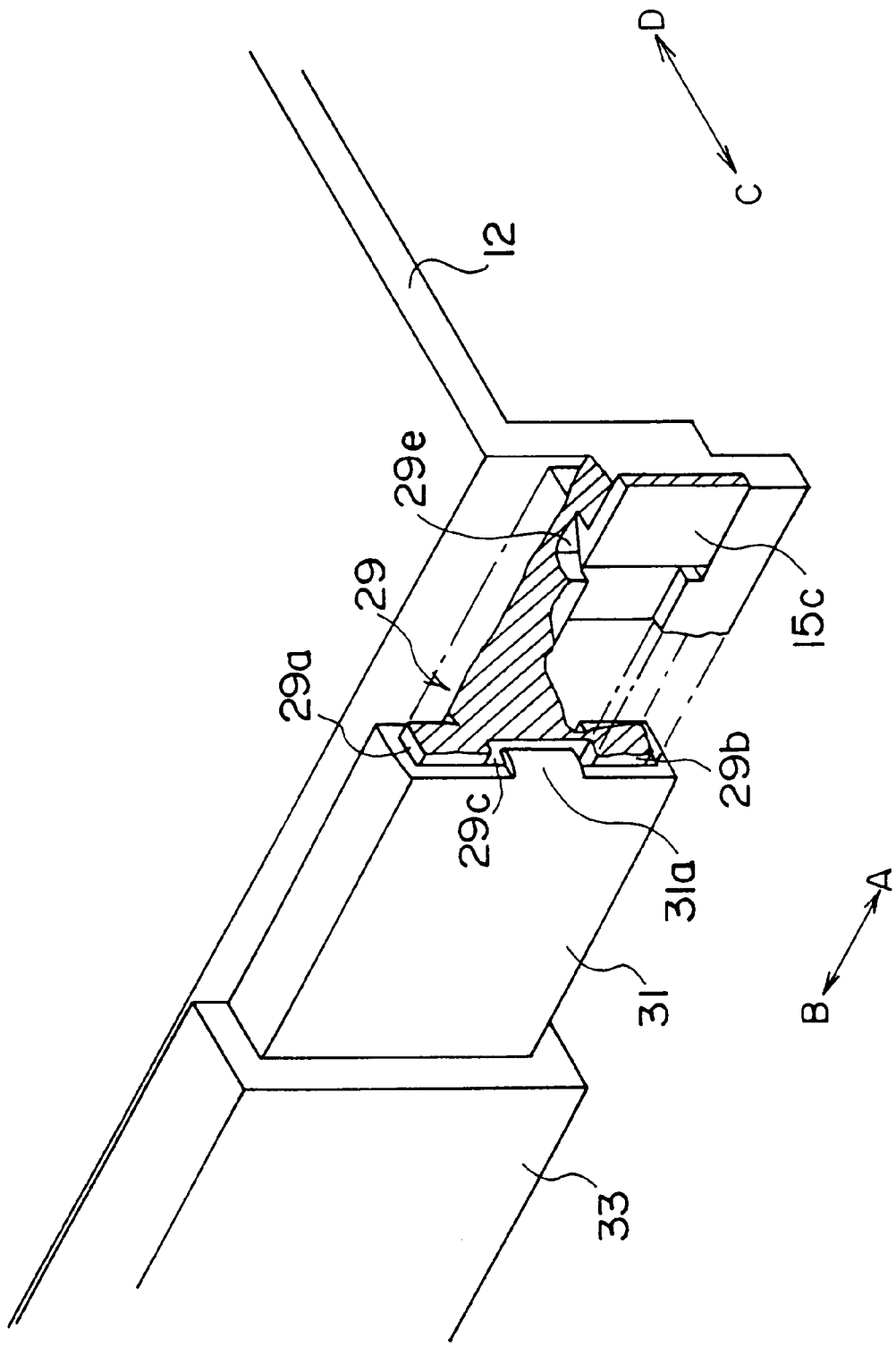
FIG. 9 is an enlarged view of a portion of the tray in which the left slide rail is installed to the left rail connecting portion on the tray.
Figure 10:
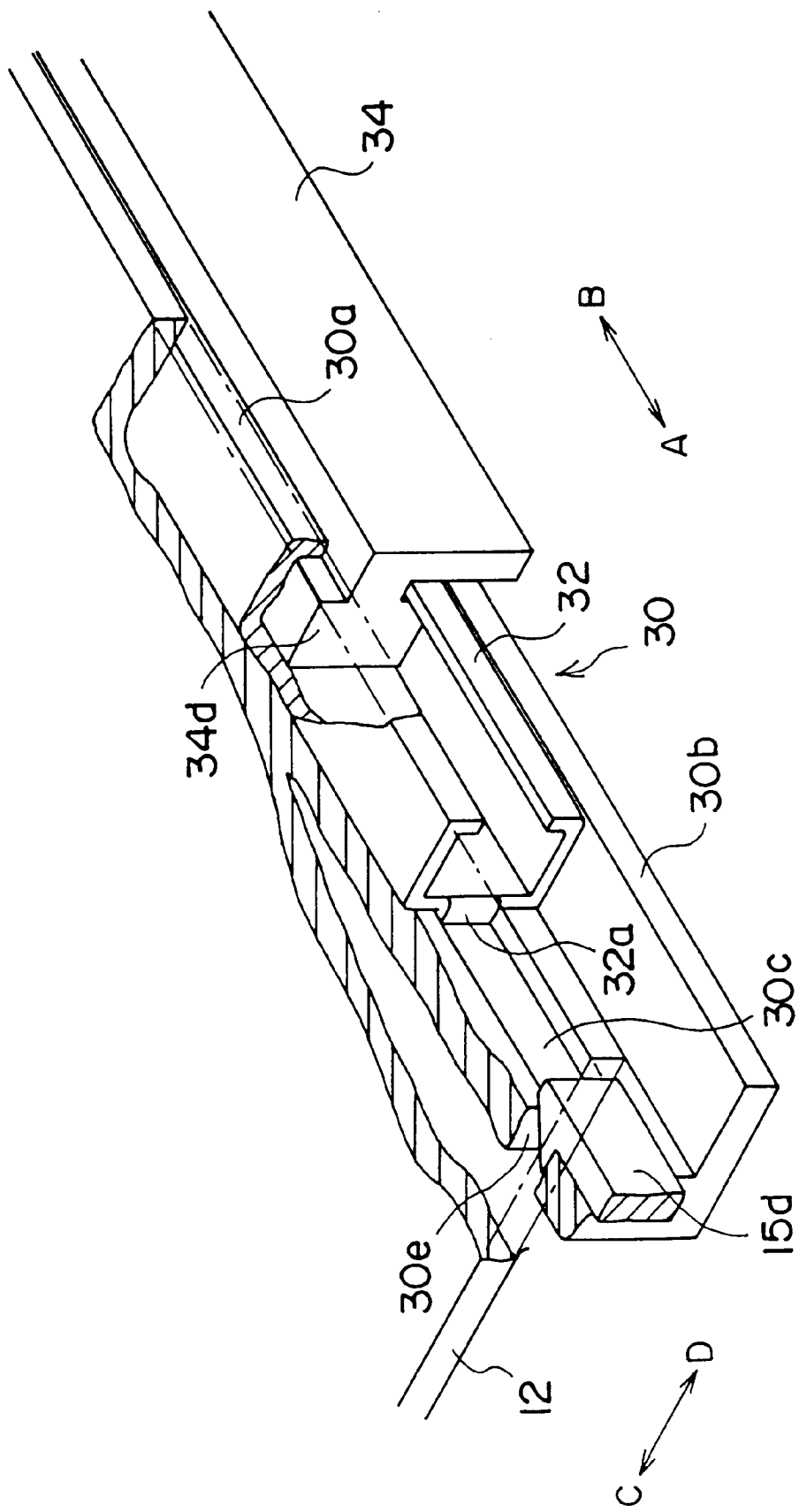
FIG. 10 is an enlarged view of a portion of the tray in which the right slide rail is installed to the right rail connecting portion on the tray.

FIG. 9 shows a portion of the tray 12 in which the slide rail 31 is installed to the rail connecting portion 29. FIG. 10 shows a portion of the tray 12 in which the slide rail 32 is installed to the rail connecting portion 30.

As shown in FIGS. 8 and 9, the slide rail 31 has a cross section which is generally in the shape of the character "C". The slide rail 31 is fitted to the lateral projections 29a and 29b of the rail connecting portion 29. The lateral projections 29a and 29b prevent the slide rail 31 from being separated from the rail connecting portion 29 in a vertical direction. The slide rail 31 is movable to the tray 12 in either the ejecting direction A or the inserting direction B.

The rail guide part 33 is fixed to the inside left wall of the chassis 18. The rail guide part 33 has a cross section which is generally in the shape of the character "C". The slide rail 31 is fitted to the rail guide part 33 on the chassis 18 such that the outside surfaces of the slide rail 31 are enclosed in the rail guide part 33 as shown in FIG. 9. As the slide rail 31 is fitted to the rail guide part 33 on the chassis 18, the movement of the slide rail 31 in either the ejecting direction A or the inserting direction B is guided by the rail guide part 33. As the slide rail 31 is fitted to the rail connecting portion 29 on the left side of the tray 12, the movement of the tray 12 in either the ejecting direction A or the inserting direction B is guided by the rail connecting portion 29.

The slide rail 31 has a projecting portion 31a at a front end of the slide rail 31, and the projecting portion 31a is formed by bending it inward to the tray 12. The projecting portion 31a is movable along the groove 29c of the rail connecting portion 29. When the tray 12 is moved to the chassis 18 in the inserting direction B, the projecting portion 31a is brought into contact with the connecting claw 15c of the front bezel 15. By the contact of the projecting portion 31a with the connecting claw 15c, the tray 12 and the slide rail 31 are moved together in the inserting direction B. When the tray 12 is moved to the chassis 18 in the ejecting direction A, the projecting portion 31a is brought into contact with the land 29f of the rail connecting portion 29. By the contact of the projecting portion 31a with the land 29f, the tray 12 and the slide rail 31 are moved together in the ejecting direction A.

The slide rail 31 has a connecting hole 31b at a rear end of the slide rail 31, as shown in FIG. 8. The connecting hole 31b restricts a further movement of the slide rail 31 in the ejecting direction A when the tray 12 is at the disk-change position.

Similarly, as shown in FIGS. 8 and 10, the slide rail 32 has a cross section which is generally in the shape of the character "C". The slide rail 32 is fitted to the downward projections 30a and the upward projections 30b of the rail connecting portion 30. The projections 30a and 30b prevent the slide rail 32 from being separated from the rail connecting portion 29 vertically and laterally. The slide rail 32 is movable to the tray 12 in either the ejecting direction A or the inserting direction B.

The rail guide part 34 is fixed to the inside right wall of the chassis 18. The slide rail 32 is fitted to a rail guide 34d of the rail guide part 34 such that the inside surfaces of the slide rail 32 slidably touches the rail guide 34d of the rail guide part 34 as shown in FIG. 10. As the slide rail 32 is fitted to the rail guide part 34 on the chassis 18, the movement of the slide rail 32 in either the ejecting direction A or the inserting direction B is guided by the rail guide part 34. As the slide rail 32 is fitted to the rail connecting portion 30 on the tray 12, the movement of the tray 12 in either the ejecting direction A or the inserting direction B is guided by the rail connecting portion 30.

The slide rail 32 has a projecting portion 32a at a front end of the slide rail 32, and the projecting portion 32a is formed by bending it inward to the tray 12. The projecting portion 32a is movable along the groove 30c of the rail connecting portion 30. When the tray 12 is moved to the chassis 18 in the inserting direction B, the projecting portion 31a is brought into contact with the connecting claw 15d of the front bezel 15. By the contact of the projecting portion 32a with the connecting claw 15d, the tray 12 and the slide rail 32 are moved together in the inserting direction B. When the tray 12 is moved to the chassis 18 in the ejecting direction A, the projecting portion 32a is brought into contact with the land 30f of the rail connecting portion 30. By the contact of the projecting portion 32a with the land 30f, the tray 12 and the slide rail 32 are moved together in the ejecting direction A.

The slide rail 32 has a connecting hole 32b at a rear end of the slide rail 32, as shown in FIG. 8. The connecting hole 32b restricts a further movement of the slide rail 32 in the ejecting direction A when the tray 12 is at the disk-change position.

Figure 11:
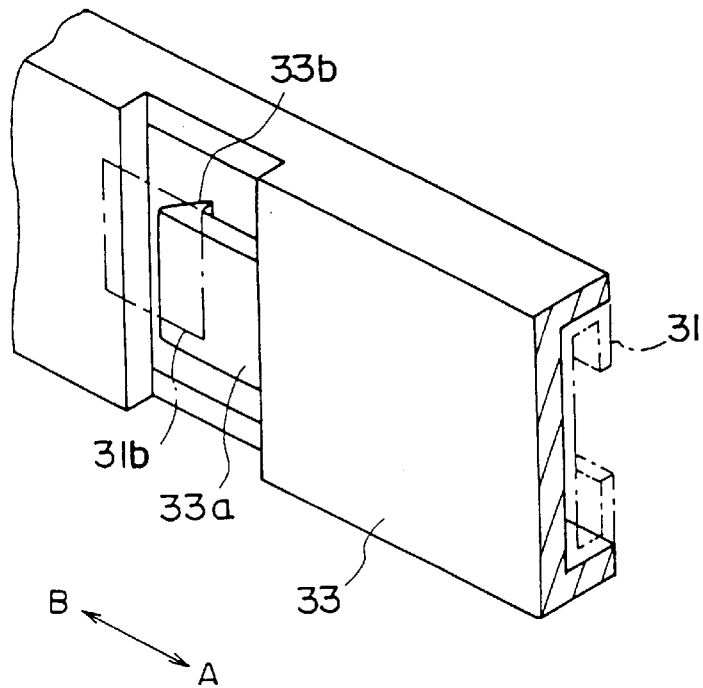
FIG. 11 is an enlarged view of a connecting claw of a left rail guide part with which the left slide rail is locked.

FIG. 11 shows a connecting claw 33a of the rail guide part 33 with which the slide rail 31 is locked.

As shown in FIG. 11, the tray 12 is pulled out from the chassis 18, and the slide rail 31 is moved to the chassis 18 in the ejecting direction A so that the tray 12 is moved to the disk-change position. The connecting claw 33a, which is provided at an intermediate portion of the rail guide part 33 on the chassis 18, has an inward projection 33b. The inward projection 33b is fitted into the connecting hole 31b of the slide rail 31 when the tray 12 is at the disk-change position. Thus, the slide rail 31 and the tray 12 are locked with the connection of the connecting hole 31b and the projection 33b when the tray 12 is at the disk-change position.

Figure 12:
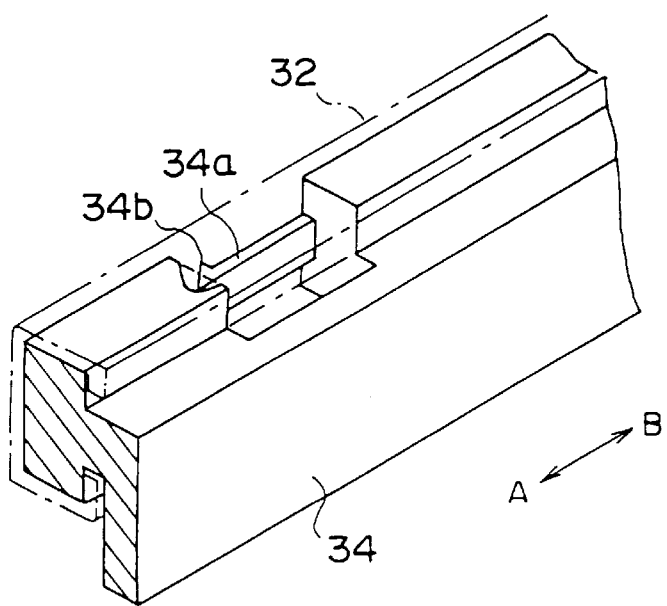
FIG. 12 is an enlarged view of a connecting claw of a right rail guide part with which the right slide rail is locked.
Figure 13:
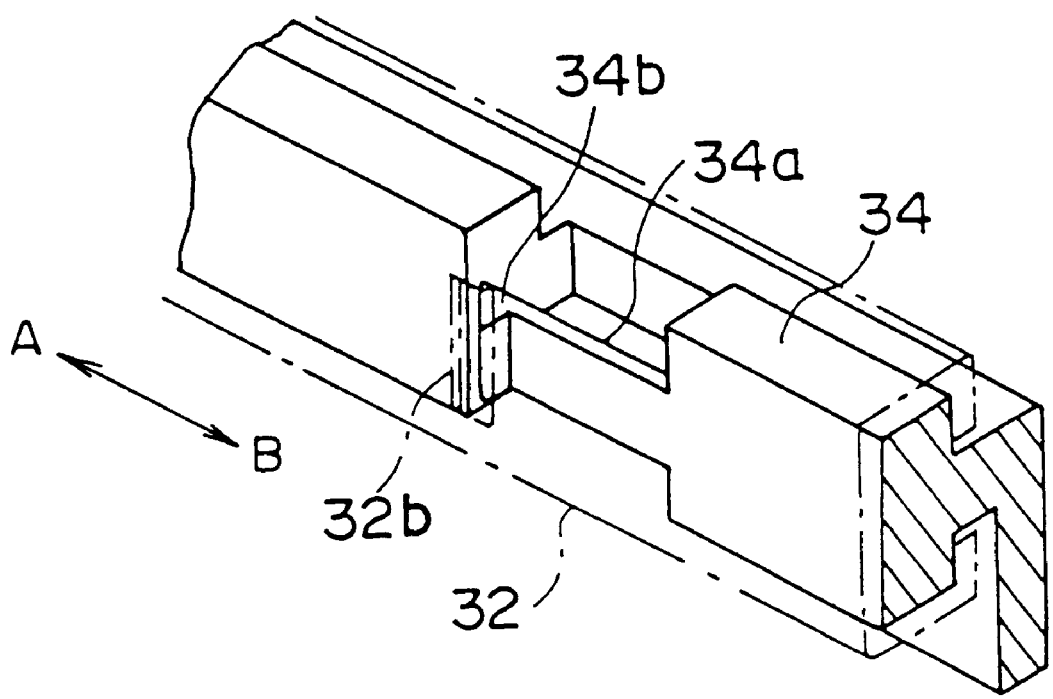
FIG. 13 is an enlarged view of the connecting claw of the right rail guide part in FIG. 12 when viewed from the opposite side.

FIG. 12 shows a connecting claw 34a of the rail guide part 34 with which the slide rail 32 is locked. FIG. 13 shows the connecting claw 34a of the rail guide part 34 in FIG. 12 when viewed from the opposite side.

As shown in FIGS. 12 and 13, the tray 12 is pulled out from the chassis 18, and the slide rail 32 is moved to the chassis 18 in the ejecting direction A so that the tray 12 is moved to the disk-change position. The connecting claw 34a, which is provided at an intermediate portion of the rail guide part 34 on the chassis 18, has an inward projection 34b. The inward projection 34b is fitted into the connecting hole 32b of the slide rail 32 when the tray 12 is at the disk-change position. Thus, the slide rail 32 and the tray 12 are locked with the connection of the connecting hole 32b and the projection 34b when the tray 12 is at the disk-change position.

Both the leading ends of the projection 33b of the rail guide part 33 and the projection 34b of the rail guide part 34 are formed into slanting surfaces as shown in FIGS. 11 and 13. When the front bezel 15 presses the front ends of the slide rails 31 and 32 on the sides of the tray 12 in the inserting direction B, the connecting claws 33a and 34a are resiliently deformed outward in the lateral directions C and D. When the tray 12 is manually inserted into the chassis 18 in the inserting direction B, the slide rails 31 and 32 are moved to the chassis 18 in the inserting direction B. As the projections 33b and 34b are separated from the connecting holes 31b and 32b when the tray 12 is manually inserted into the chassis 18, the tray 12 and the slide rails 31 and 32 are moved together to the chassis 18 in the inserting direction B.

Next, a description will be given of installing operations for installing the tray guide mechanism 17 of the present embodiment to the disk apparatus 11, with reference to FIGS. 8, 14 and 15.

Figure 14:
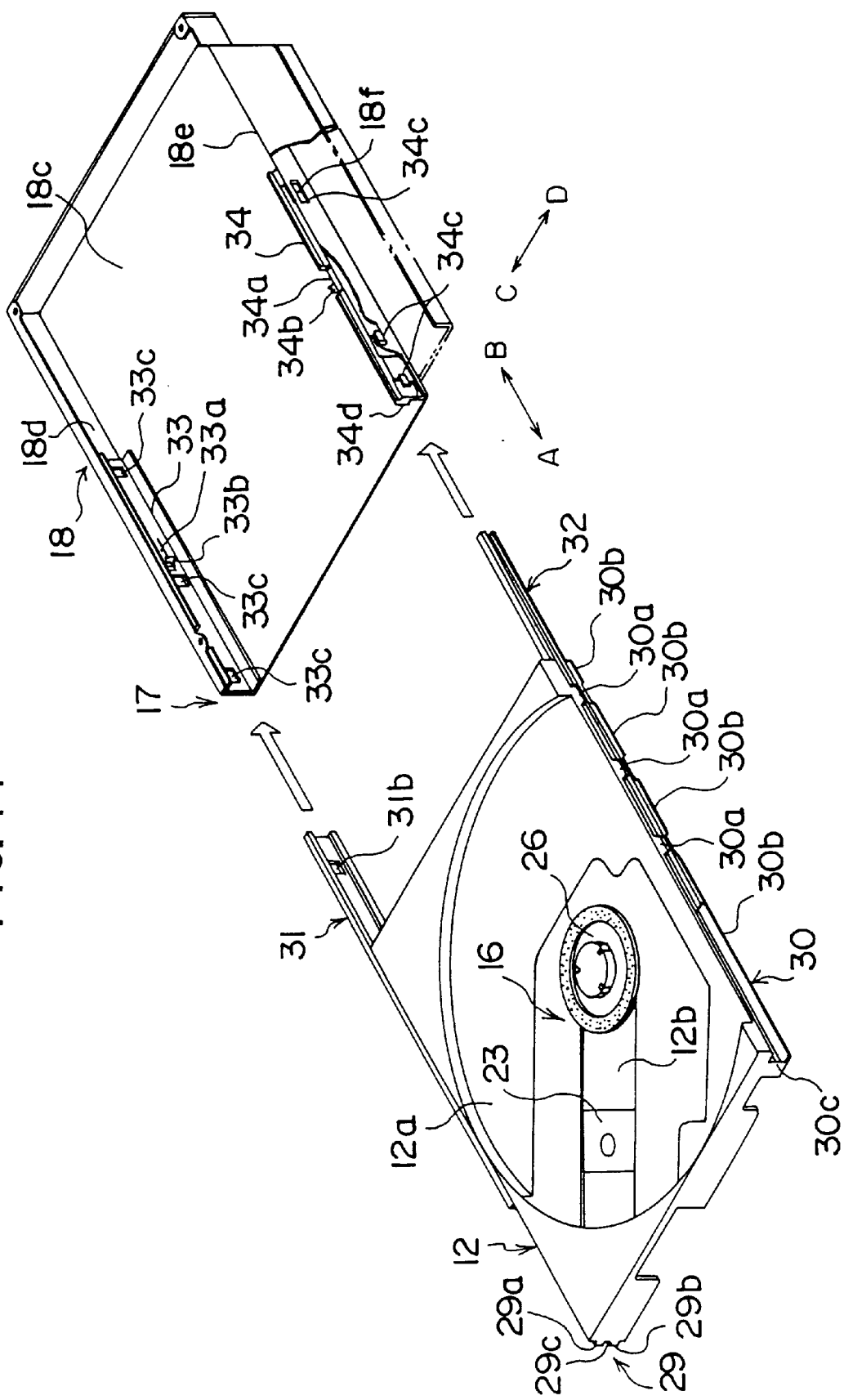
FIG. 14 is a diagram for explaining an installing operation to install the slide rails of the tray to a chassis after the installing operation in FIG. 8.

FIG. 14 shows an installing operation to install the slide rails of the tray to a chassis after the installing operation in FIG. 8. FIG. 15 shows an installing operation to install a front bezel to the tray after the installing operation in FIG. 14.

As shown in FIG. 8, the slide rails 31 and 32 are installed to the rail connecting portions 29 and 30 on the sides of the tray 12. That is, the slide rail 31 is fitted onto the lateral projections 29a and 29b of the rail connecting portion 29 by inserting the rear end of the slide rail 31 into the front end of the rail connecting portion 29 in the inserting direction B, and, at the same time, the slide rail 32 is fitted onto the downward projection 30a and the upward projection 30b of the rail connecting portion 30 by inserting the rear end of the slide rail 32 into the front end of the rail connecting portion 30 in the inserting direction B.

After the installing operation in FIG. 8 is performed, the rail guide parts 33 and 34 are installed to the chassis 18, and the slide rails 31 and 32 of the tray 12 are installed to the rail guide parts 33 and 34 of the chassis 18, as shown in FIG. 14.

The chassis 18 includes, as shown in FIG. 14, a tray holding portion 18c, a left inside wall 18d and a right inside wall 18e. Both the left and right inside walls 18d and 18e have a plurality of mounting holes 18f. The rail guide part 33 has a plurality of hooks 33c which are bent at right angles to the direction A, and the rail guide part 34 has a plurality of the hooks 34c which are bent at right angles to the direction A. The rail guide part 33 is fixed to the left inside wall 18d of the chassis 18 by fitting the hooks 33c into the mounting holes 18f of the left inside wall 18d, the rail guide part 34 is fixed to the right inside wall 18e of the chassis 18 by fitting the hooks 34c into the mounting holes 18f of the right inside wall 18e.

After the rail guide parts 33 and 34 are installed to the chassis 18, the slide rails 31 and 32 of the tray 12 are installed to the chassis 18 by inserting the slide rails 31 and 32 into the rail guide parts 33 and 34 of the chassis 18, as shown in FIG. 14. That is, as shown in FIGS. 9 and 10, the slide rail 31 is fitted to the inside surfaces of the rail guide part 33 by inserting the rear end of the slide rail 31 into the front end of the rail guide part 33 in the inserting direction B, and, at the same time, the slide rail 32 is fitted to the outside surfaces of the rail guide 34d of the rail guide part 34 by inserting the rear end of the slide rail 32 into the front end of the rail guide part 34 in the inserting direction B.

Figure 15:
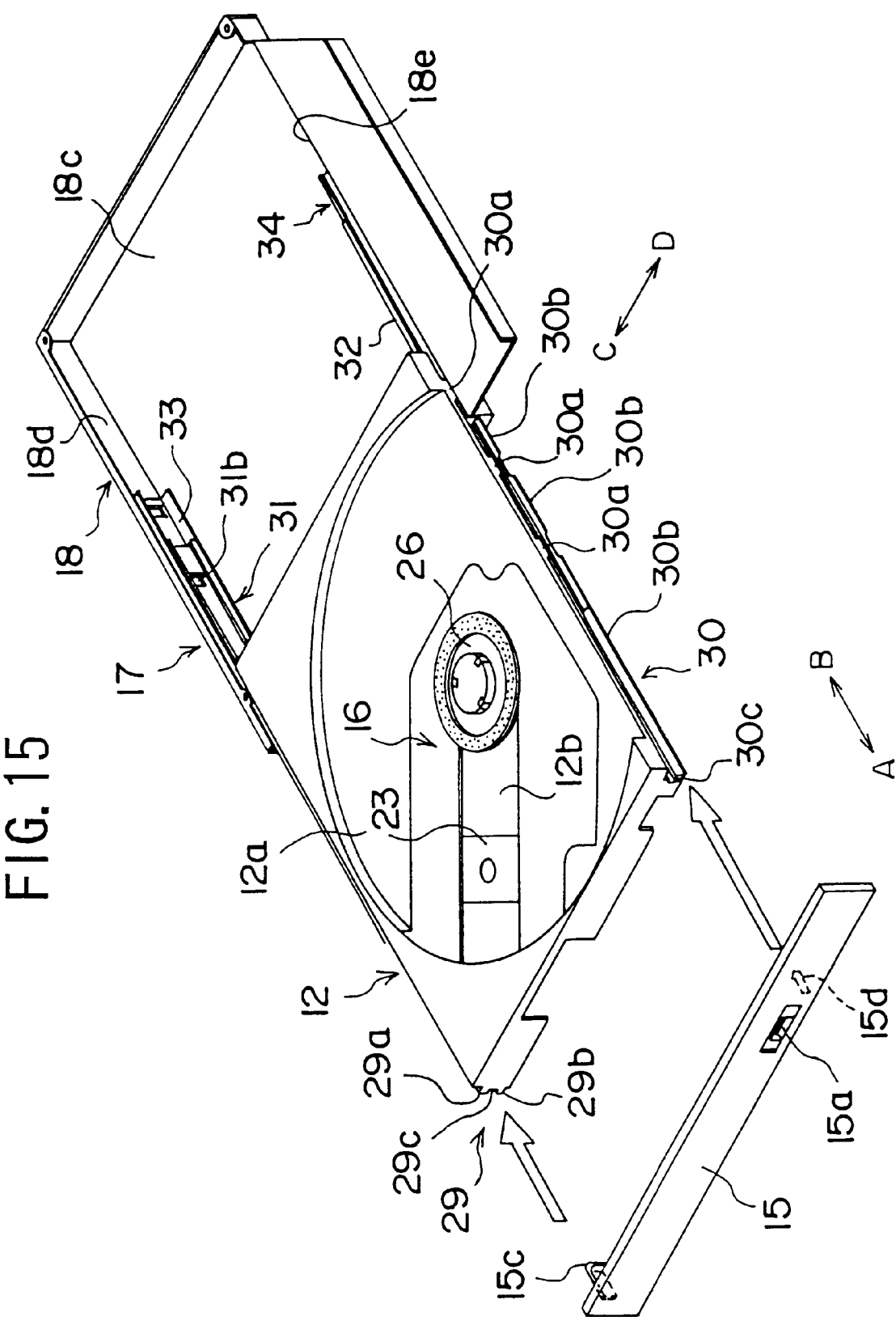
FIG. 15 is a diagram for explaining an installing operation to install a front bezel to the tray after the installing operation in FIG. 14.

After the slide rails 31 and 32 are installed to the chassis 18, the front bezel 15 is installed to the tray 12 as shown in FIG. 15. That is, the front bezel 15 is attached to the tray 12 by fitting the connecting claw 15c into the recess 29e of the rail connecting portion 29 and fitting the connecting claw 15d into the recess 30e of the rail connecting portion 30. The front bezel 15 is thus installed to the front end surface of the tray 12 as shown in FIG. 6. The connecting claws 15c and 15d of the front bezel 15, which are fitted into the rail connecting portions 29 and 30 of the tray 12, prevent the slide rails 31 and 32 from being separated from the tray 12 in the ejecting direction A. Then, all the installing operations for installing the tray guide mechanism 17 of the present embodiment to the disk apparatus 11 are performed.

In the above-described embodiment, the installing operations for installing the tray guide mechanism 17 to the disk apparatus 11 can be easily performed. That is, the rail guide parts 33 and 34 are fixed to the inside walls 18d and 18e of the chassis 18. The slide rails 31 and 32 are fitted to the rail connecting portions 29 and 30 of the tray 12, and the slide rails 31 and 32 of the tray 12 are fitted to the rail guide parts 33 and 34 of the chassis 18. The front bezel 15 is attached to the tray 12. All the installing directions in which the rail guide parts 33 and 34, the slide rails 31 and 32 and the front bezel 15 are installed are the same as the inserting direction B. Therefore, the time to assembly the disk apparatus with the tray guide mechanism 17 of the present embodiment is remarkably reduced, and the assembly processes for the component parts of the tray guide mechanism 17 are simplified. Accordingly, the tray guide mechanism 17 of the present embodiment makes it possible to improve the productivity and reduce the manufacturing cost.

Further, in the above-described embodiment, the rail connecting portions 29 and 30 on the sides of the tray 12 are integrally formed with the tray 12 by carrying out resin molding by using the same resin material. It is unnecessary for the tray guide mechanism 17 of the present embodiment to attach additional rail guide members to the sides of the tray 12 by screws, in order for supporting the slide rails 31 and 32 on the tray 12. The total number of component parts for the tray guide mechanism 17 of the present embodiment is reduced to a number smaller than that of the conventional disk apparatus shown in FIGS. 16 and 17. Accordingly, the tray guide mechanism 17 of the present embodiment makes it possible to improve the productivity and reduce the manufacturing cost.

The above-described embodiment is applied to the CD-ROM disk apparatus. However, the present invention is not limited to the above-described embodiment, and the tray guide mechanism of the present invention is also applicable to other disk drives, including: a CD disk apparatus for accessing a compact disk (CD); a magnetic disk apparatus for accessing a magnetic disk; a magneto-optical disk apparatus for accessing a magneto-optical disk; and an optical disk apparatus for accessing an optical disk.

Further, in the above-described embodiment, the movement of the tray in either the ejecting direction or the inserting direction is manually performed by the operator. However, it is a matter of course that the present invention is applicable to a disk apparatus including a tray moving unit which automatically moves the tray in either the ejecting direction or the inserting direction by using a motor.

What is claimed is:

1. A tray guide mechanism for guiding a movement of a tray in one of an inserting direction to insert the tray into a chassis of a disk apparatus and an ejecting direction to eject the tray from the chassis, a disk placed on the tray being accessed by the disk apparatus, said tray guide mechanism comprising:

first and second rail connecting units provided on first and second sides of the tray, said entire first and second rail connecting units being molded to the tray;

first and second slide rails movably supported on said rail connecting units; and first and second rail guide units fixed on first and second inside walls of the chassis and movably supporting the first and second slide rails on the first and second rail guide units respectively, wherein the second rail connecting unit comprises a plurality of downward projections and a plurality of upward projections both being provided along the second rail connecting unit at given intervals, and the second slide rail being fitted to the downward projections and the upward projections of the second rail connecting unit, and fitted to the second rail guide unit such that inside surfaces of the second slide rail slidably touch the second rail guide unit.

2. The tray guide mechanism according to claim 1, wherein each of said first and second rail guide units comprises a front end and a longitudinally extending surface, said first and second slide rails being fitted to said longitudinally extending surfaces of said first and second rail guide units respectively by inserting the rear end of each slide rail into the front end of one of the first and second rail guide units in the inserting direction.

3. The tray guide mechanism according to claim 1, wherein said first and second slide rails are fitted into grooves of said first and second rail connecting units respectively by inserting the rear end of each slide rail into the front end of one of the first and second rail connecting units in the inserting direction.

4. The tray guide mechanism according to claim 1, wherein each of the first and second rail guide units comprises a connecting claw molded to an intermediate portion of the rail guide unit, the connecting claw of each rail guide unit having an inward projection, and the inward projection of the connecting claw of each rail guide unit is fitted into a connecting portion of one of the first and second slide rails when a rear end of each slide rail is moved in the ejecting direction to the intermediate portion of the rail guide unit, so that the tray and the slide rail are locked.

5. The tray guide mechanism according to claim 4, wherein the connecting portion of each slide rail is a connecting hole at a rear end of the slide rail, and the inward projection of the connecting claw of each rail guide unit is fitted into said connecting hole.

6. The tray guide mechanism according to claim 4, wherein the disk apparatus comprises a front bezel attached to the tray, each of the first and second rail connecting units comprising a recess provided in a groove at an end of the rail connecting unit, and said front bezel comprising a connecting claw, said connecting claw of said front bezel being fitted into said recess of each rail connecting unit.

7. The tray guide mechanism according to claim 6, wherein said connecting claw of the front bezel prevents each slide rail from being separated from the tray in the ejecting direction.

8. The tray guide mechanism according to claim 5, wherein the disk apparatus comprises a front bezel attached to the tray, each of the first and second rail connecting units comprising a recess provided in a groove at a front end of the rail connecting unit, each of the first and second slide rails comprising a projecting portion at a front end of the slide rail, said front bezel comprising a connecting claw, said connecting claw of said front bezel being fitted into said recess of each rail connecting unit, and wherein the projecting portion of each slide rail touches the connecting claw of the front bezel when the front end of the slide rail is moved in the ejecting direction to the front end of one of the first and second rail connecting units, whereby the connecting claw of the front bezel prevents each slide rail from being separated from the tray in the ejecting direction.

9. The tray guide mechanism according to claim 1, wherein the tray is configured to have a lateral width that is smaller than a diameter of the disk, the disk placed on the tray partially projects from the second side of the tray, and the second slide rail is arranged below the partially projecting portion of the disk.

10. The tray guide mechanism according to claim 1, wherein the tray includes a top surface and a recess provided at a height lower than the top surface, the disk is placed onto the recess of the tray, and the second slide rail is arranged below the recess of the tray.

11. The tray guide mechanism according to claim 1, wherein the disk on the tray has no projection from the first side of the tray, and the first rail connecting unit on the first side of the tray comprises a pair of longitudinally extending projections with a groove between the projections, the first slide rail being fitted into the groove of the first rail connecting unit and fitted to the first rail guide unit such that outside surfaces of the first slide rail are enclosed in the first rail guide unit.

* * * * *